(12) United States Patent
Berning et al.

(10) Patent No.: US 10,927,513 B2
(45) Date of Patent: *Feb. 23, 2021

(54) SYSTEM AND METHOD FOR THE TRACKING OF MILLING MATERIAL

(71) Applicant: Wirtgen GmbH, Windhagen (DE)

(72) Inventors: Christian Berning, Zulpich (DE); Cyrus Barimani, Königswinter (DE); Christoph Menzenbach, Neustadt/Wied (DE)

(73) Assignee: Wirtgen GmbH

(*) Notice: Subject to any disclaimer, the term of this patent is extended or adjusted under 35 U.S.C. 154(b) by 0 days.

This patent is subject to a terminal disclaimer.

(21) Appl. No.: 16/414,916

(22) Filed: May 17, 2019

(65) Prior Publication Data

US 2019/0338640 A1 Nov. 7, 2019

Related U.S. Application Data

(63) Continuation-in-part of application No. 15/811,734, filed on Nov. 14, 2017, now Pat. No. 10,329,910, and
(Continued)

(30) Foreign Application Priority Data

Nov. 11, 2016 (DE) .................... 10 2016 222 145
Nov. 25, 2016 (DE) .................... 10 2016 223 454

(51) Int. Cl.
*E01C 23/088* (2006.01)
*E01C 23/00* (2006.01)
(Continued)

(52) U.S. Cl.
CPC ............ *E01C 23/00* (2013.01); *E01C 23/088* (2013.01); *E21C 39/00* (2013.01); *G01B 21/18* (2013.01);
(Continued)

(58) Field of Classification Search
CPC ............................ E01C 23/088; E01C 23/127
See application file for complete search history.

(56) References Cited

U.S. PATENT DOCUMENTS

| 4,006,936 A | 2/1977 | Crabiel |
| 4,655,634 A | 4/1987 | Loy et al. |

(Continued)

FOREIGN PATENT DOCUMENTS

| AT | 382683 B | 3/1987 |
| CN | 101666622 A | 3/2010 |

(Continued)

OTHER PUBLICATIONS

China Search Report for corresponding CN 2017110979089, dated Nov. 9, 2017, 2 pages (not prior art).

(Continued)

*Primary Examiner* — Janine M Kreck
(74) *Attorney, Agent, or Firm* — Lucian Wayne Beavers; Gary L. Montle; Patterson Intellectual Property Law, PC (57) ABSTRACT

A system and method are provided for the tracking of material milled via a milling machine, to improve recycling possibilities for the milling material. The milling material removed during milling is deposited onto a vehicle for transport to a deposition site. A first detection device associated with the milling machine detects data signals relating to the milling material, and the milling material is tracked via a documentation device comprising a user interface, based at least on the data signals. The documentation device may selectively display which milling material has been unloaded at a particular deposition site. A marking device may be provided to mark the milling material or the transport vehicle, and/or a second detection device may be provided to detect position data corresponding to the deposition site, wherein the marking and/or position data are
(Continued)

interlinked with the data signals relating to the milling material in the documentation device.

20 Claims, 9 Drawing Sheets

Related U.S. Application Data a continuation-in-part of application No. 15/806,360, filed on Nov. 8, 2017, now Pat. No. 10,323,516.

(51) Int. Cl.

| | | |
|---|---|---|
| E21C 39/00 | (2006.01) | |
| G01F 22/00 | (2006.01) | |
| G06Q 50/02 | (2012.01) | |
| G01B 21/18 | (2006.01) | |
| G06Q 10/08 | (2012.01) | |

(52) U.S. Cl.
CPC .......... *G01F 22/00* (2013.01); *G06Q 10/087* (2013.01); *G06Q 50/02* (2013.01)

(56) References Cited

U.S. PATENT DOCUMENTS

| | | | |
|---|---|---|---|
| 4,715,657 A | 12/1987 | Sato et al. | |
| 4,968,098 A | 11/1990 | Hirsch et al. | |
| 4,981,327 A | 1/1991 | Bessinger et al. | |
| 6,201,567 B1 | 3/2001 | Kuroda | |
| 6,666,521 B1 | 12/2003 | Pease et al. | |
| 6,887,013 B2 | 5/2005 | Ley et al. | |
| 6,990,390 B2 | 1/2006 | Groth et al. | |
| 7,422,391 B2 | 9/2008 | Holl et al. | |
| 7,905,682 B2 | 3/2011 | Holl et al. | |
| 8,177,871 B2 | 5/2012 | Soma et al. | |
| 8,386,196 B2 | 2/2013 | Wagner et al. | |
| 8,757,730 B2 | 6/2014 | Wachsmann et al. | |
| 8,775,099 B2 | 7/2014 | Wagner et al. | |
| 9,121,146 B2 | 9/2015 | Paulsen et al. | |
| 9,234,320 B2 | 1/2016 | Abresch et al. | |
| 10,323,516 B2 * | 6/2019 | Berning | E01C 23/088 |
| 10,329,910 B2 * | 6/2019 | Berning | E21C 39/00 |
| 2005/0207841 A1 | 9/2005 | Holl et al. | |
| 2008/0153402 A1 | 6/2008 | Arcona et al. | |
| 2010/0063691 A1 | 3/2010 | Hall et al. | |
| 2011/0080034 A1 | 4/2011 | Von Schnebeck et al. | |
| 2011/0307149 A1 | 12/2011 | Pighi et al. | |
| 2012/0049607 A1 | 3/2012 | Frederick | |
| 2013/0035874 A1 | 2/2013 | Hall et al. | |
| 2013/0035875 A1 | 2/2013 | Hall et al. | |
| 2013/0080000 A1 | 3/2013 | Von der Lippe et al. | |
| 2013/0128279 A1 | 5/2013 | Wachsmann et al. | |
| 2014/0116776 A1 | 5/2014 | Marx et al. | |
| 2014/0324364 A1 | 10/2014 | Wagner et al. | |
| 2015/0149027 A1 | 5/2015 | Paulsen et al. | |
| 2015/0197253 A1 | 7/2015 | Zhu | |
| 2016/0052731 A1 | 2/2016 | Berning et al. | |
| 2016/0187182 A1 | 6/2016 | Beltramin | |
| 2016/0194840 A1 | 7/2016 | Berning et al. | |
| 2016/0208447 A1 | 7/2016 | Berning et al. | |
| 2016/0348324 A1 | 12/2016 | Engelmann et al. | |
| 2017/0009408 A1 | 1/2017 | Marsolek et al. | |
| 2017/0009578 A1 | 1/2017 | Barimani et al. | |
| 2017/0205814 A1 | 7/2017 | Marsolek | |

FOREIGN PATENT DOCUMENTS

| | | |
|---|---|---|
| CN | 101745874 A | 6/2010 |
| CN | 204151656 U | 2/2015 |
| CN | 207998778 U | 10/2018 |
| DE | 3136434 A1 | 3/1983 |
| DE | 3411892 A1 | 10/1985 |
| DE | 3218754 C2 | 11/1985 |
| DE | 3504610 A1 | 8/1986 |
| DE | 3505408 A1 | 8/1986 |
| DE | 3616170 A1 | 3/1987 |
| DE | 3818213 A1 | 11/1989 |
| DE | 10015005 A1 | 10/2001 |
| DE | 10203732 A1 | 8/2003 |
| DE | 102005016346 B3 | 1/2007 |
| DE | 102008045470 A1 | 3/2010 |
| DE | 102010014903 A1 | 10/2011 |
| DE | 102013112972 A1 | 5/2015 |
| EP | 697604 A1 | 2/1996 |
| EP | 1039036 A2 | 9/2000 |
| EP | 1396581 B1 | 10/2008 |
| EP | 2887049 A1 | 6/2015 |
| EP | 3115507 A1 | 1/2017 |
| FR | 2610114 A1 | 7/1988 |
| JP | 941863 C | 2/1972 |
| WO | 2015140121 A2 | 9/2015 |
| WO | 2017030778 A1 | 2/2017 |
| WO | 2017125607 A1 | 7/2017 |

OTHER PUBLICATIONS

International Preliminary Report on Patentability in corresponding international application No. PCT/EP2015/055470 dated Sep. 20, 2016, 7 pp. (not prior art).

International Search Report in corresponding international application No. PCT/EP2015/055470 dated Nov. 16, 2015, 5 pp. (not prior art).

Written opinion of International Search Report in corresponding international application No. PCT/EP2015/055470 dated Nov. 16, 2015, 6 pp. (not prior art).

European Search Report of European Patent Application EP 16202024. 2, dated Jul. 11, 2017, 11 pp (not prior art).

Caterpillar Operation & Maintenance Manual, PR-1000 Pavement Profiler, Jul. 1990, 78 pages.

Arra Basic Asphalt Recycling Manual, U.S. Department of Transportation Federal Highway Administration, 108 pages, 2001.

Liang et al., Vision-Based Automatic Tool Wear Monitoring System, Jun. 25-27, 2008, Proceedings of the 7th World Congress on Intelligent Control and Automation, Chongqing, China, pp. 6031-6035.

\* cited by examiner

SYSTEM AND METHOD FOR THE TRACKING OF MILLING MATERIAL

CROSS-REFERENCES TO RELATED APPLICATIONS

This application is a continuation-in-part of U.S. patent application Ser. No. 15/811,734, filed Nov. 14, 2017, further claiming benefit of German Patent Application No. 10 2016 223 454.4, filed Nov. 25, 2016, and is also a continuation-in-part of U.S. patent application Ser. No. 15/806,360, filed Nov. 8, 2017, further claiming benefit of German Patent Application No. 10 2016 222 145.0, filed Nov. 11, 2016, each of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The invention relates to a system and a method for the tracking of milling material in accordance with claims as submitted herewith.

Milling machines are known which can be used to mill sections of a ground pavement in a milling operation. Moreover, the milling material removed during milling of the section of the ground pavement is loaded onto a transport vehicle, specifically a truck or a tractor provided with a trailer, and transported away. The milling material transported away on the transport vehicle is deposited on a deposition site. It is known to detect data signals relating to the milling material by means of a first detection device. The milling depth and the removed milling volume, for example, are detected in the process.

There is, however, a growing requirement to recycle the removed milling material.

BRIEF SUMMARY

It is therefore an object of a system and method in various embodiments as disclosed herein to improve the recycling possibilities of milling material.

In one embodiment, a method for the tracking of milling material comprises milling, via a milling machine in a milling operation, a section of a ground pavement in a first location. Milling material removed during milling of the section of the ground pavement is deposited onto a transport vehicle for transport to a second location. The transport vehicle may be, for example, a truck or a tractor provided with a trailer. A first detection device associated with the milling machine detects data signals relating to the milling material. A documentation device comprising a user interface tracks the milling material, based at least on the data signals relating to the milling material.

The first detection device may detect the data signals relating to the milling material from the control device of the milling machine.

The first detection device may be arranged at the milling machine, and preferably is part of the control device of the milling machine.

The data signals relating to the milling material may relate to the material properties of the milling material and may specifically relate to the material of the milling material and/or position data of the milled section of the ground pavement.

Regarding the data signals relating to the material properties of the milling material, these may be data signals which directly describe the material properties of the material, or may be data signals which enable conclusions to be drawn about the material. The location data of the milled section of the ground pavement may therefore also be data signals relating to the material properties of the milling material. It may be determined, for example, which motorway section is being milled. It may be known which material has been used in the construction of the motorway section so that it can be determined based on the motorway section which material has been used in its construction.

It may be known, for example, which asphalt has been used in the construction, or the composition of the material used in the construction may be known. It may also be known which material has been used in the construction of different layers of the ground pavement. As a rule, the ground pavement comprises a surface layer, a binder layer and a base layer. The known information regarding the material may be stored in a database (for example, locally on the milling machine or outside of the milling machine), or said information may be entered by an operator of the milling machine. The location data may also be determined based on GPS coordinates. Said data signals relating to the material properties of the milling material may then be detected by the first detection device.

Samples of the milled-off material may also be taken, for example, and evaluated immediately or at a later date. For the purposes of the invention, the data signals relating to the material properties of the milling material may also be data signals which relate to the number or the name of such sample.

Material properties of the milling material may be of interest for disposal and recycling. It may be important, for example, that it is known as to whether tar is contained in the milling material, since tar requires separate disposal. Furthermore, knowledge regarding the bitumen proportions in the milling material may be relevant for recycling.

The information from which layer of the road pavement structure the milling material originates may already be of importance as a material property. In the course of a reuse, material from a base layer must, for example, not be used for the production of an asphalt mixture which is to be used as the surface layer in a new road pavement structure. The milling material originating from a surface layer, on the other hand, may be recycled into an asphalt mixture which is used as the base layer in a new road pavement structure.

The data signals relating to the milling material may be operating parameters of the milling machine, or data or data signals, respectively, which are determined by means of the operating parameters, location data or information entered. As a result, both the directly determined or entered data or data signals, respectively, as well as data derived therefrom, may be detected as data signals relating to the milling material. The data derived from the determined or entered data or data signals, respectively, may also represent information on how the milling material is to be marked by the marking device, in embodiments as further described below. Information on how the milling material is to be marked by the marking device may therefore also be the data signals relating to the milling material.

Operating parameters may specifically be the milling depth, the milling volume removed, the advance speed, the milling drum speed of revolution, the relation between advance speed and milling drum speed of revolution, the milling drum used, the torque/output emitted by the drive engine of the milling machine, or the amount of water fed during the milling process to cool the milling tools. Furthermore, it may be detected as to whether the milling machine is operating in down-milling or in up-milling mode (milling drum rotating in the same direction/in the opposite direction as the ground-engaging units). The data signals relating to the milling material may also be the mass and/or volume of the milling material loaded onto the truck.

Data or data signals may be determined by means of said operating parameters. These may be material properties of the milling material such as, for example, the grain size distribution in the milling material, fine fractions/coarse fractions. The physical properties may be derived from, for example, the relation between the advance rate and the milling drum speed of revolution, or the milling drum used.

Furthermore, it may be determined from the operating parameters, for example, from the milling depth, which layer of the ground pavement has been milled. The ground pavement comprises, for example, a surface layer, a binder layer and a base layer which, as a rule, feature different layer thicknesses. In addition to the milling depth, location data detected by the milling machine may also be taken into account, for example, to determine as to whether milling has already been performed in a specific position. This information can be correlated to allow for more accurate conclusions to be drawn about the layer just milled.

In an embodiment, tracking of the milling material therefore comprises tracking of one or more specific materials or material proportions contained in the milling material based at least on the data signals relating to the milling material.

In an embodiment, the method further comprises marking with a marking means the milling material deposited on the transport vehicle, the marking of the milling material depending on the data signals relating to the deposited milling material, or marking with a marking means the transport vehicle loaded with the milling material, the marking of the transport vehicle depending on the data signals relating to the milling material. The data signals relating to the milling material deposited on the transport vehicle are interlinked in the documentation device with information regarding the marking means used to mark the milling material deposited on the transport vehicle.

In one exemplary aspect of the aforementioned embodiment, the marking means may be transported away by the transport vehicle together with the milling material deposited on the transport vehicle.

In another exemplary aspect of the aforementioned embodiment, the marking means may be a paint applied to the milling material deposited on the transport vehicle.

In another exemplary aspect of the aforementioned embodiment, the marking means may be a data storage device associated with the transport vehicle and provided with marking data.

In an embodiment, a second detection device is further provided to detect position data corresponding to the second location (e.g., deposition site) and transmit the position data to the documentation device, wherein the position data and the data relating to the milling material are interlinked in the documentation device.

The second detection device may be a mobile telephone or a transponder, specifically, RFID chip or a device comprising a GPS receiver and preferably transmitter for the transmission of GPS data. The second detection device may also be a reading device, for example, for reading out data of a signal-transmitting device or a transponder.

Position data signals may be detected at the deposition site, which represent the position data of the deposition site. Position data signals are thus signals for position determination. Position data serve to identify the deposition site. Position data signals may, for example, be GPS signals which indicate the precise location of the deposition site. Position data may be coordinates or, for example, also the name of a landfill site which is determined by means of the GPS signals.

The second detection device may also detect the position data, for example, at the deposition site, for example, in that, for example, a transponder, for example, an RFID chip, is positioned at the deposition site. An identification code for the deposition site is stored in said transponder. This may be the name of the place, the coordinates, the name of the deposition site, or any other identification of the deposition site, where the deposition site may be a landfill site. The second detection device may detect the identification code of the transponder. The transponder may be arranged, for example, at the entrance gate of a landfill site. Alternatively, the position data may also be entered into the second detection device manually, for example, the name of a landfill site.

In the process, detection of the position data may be effected automatically, for example, when the transport vehicle is unloaded. The second detection device may, for example, register "dumping"—for example, because the second detection device may be connected to the controller of the transport vehicle or because vibrations are registered when dumping. Dumping may also be determined based on the motion profile of the transport vehicle, for example, based on the idle time or on the basis of different acceleration profiles when the transport vehicle is loaded or unloaded. Alternatively, detection may be triggered by the driver.

The second detection device may preferably be arranged at the truck or may be carried along on the truck. Alternatively, the second detection device may also be arranged near or at the milling material itself.

Transmission of the data and/or position signals between the first detection device and the documentation device and/or between the second detection device and the documentation device may be effected via, at least in part, a wireless connection, specifically, radio connection such as, for example, a WLAN or Bluetooth connection.

In an embodiment, information from any one or more of the first detection device, the marking device and the second detection device are provided to the documentation device for tracking of the milling material, which transmission may be effected via a wireless connection, specifically, radio connection or internet connection.

The documentation device may be part of the first detection device, or in appropriate embodiments may be part of the second detection device. Alternatively, the documentation device may be arranged outside of the first detection device and outside of the second detection device, and also outside of the milling machine.

In an embodiment, the documentation device comprising the user interface is configured to track and selectively display, e.g., which milling material has been unloaded at a particular deposition site.

DETAILED DESCRIPTION

Figure 1:
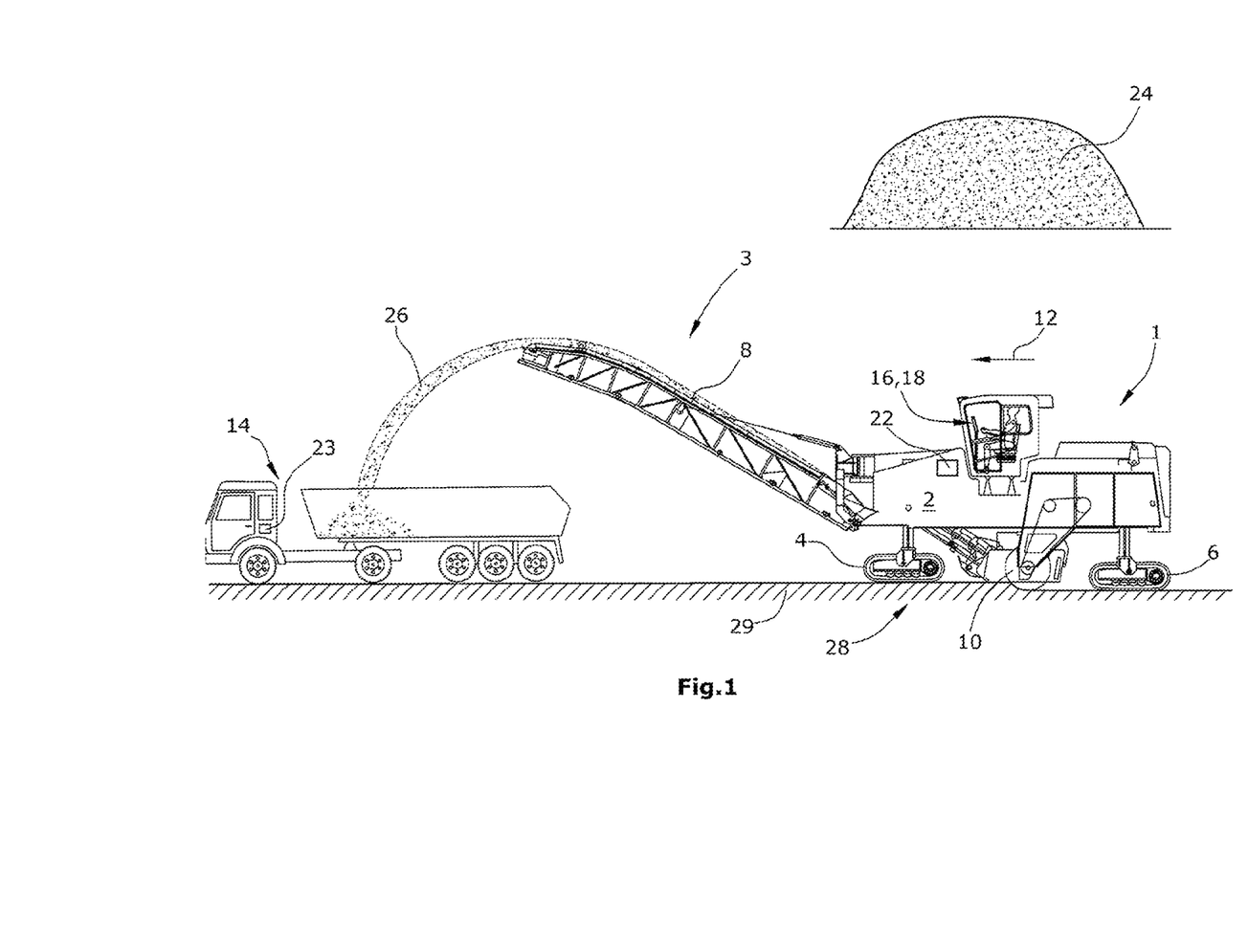
FIG. 1 represents a system for the tracking of milling material.
Figure 2:
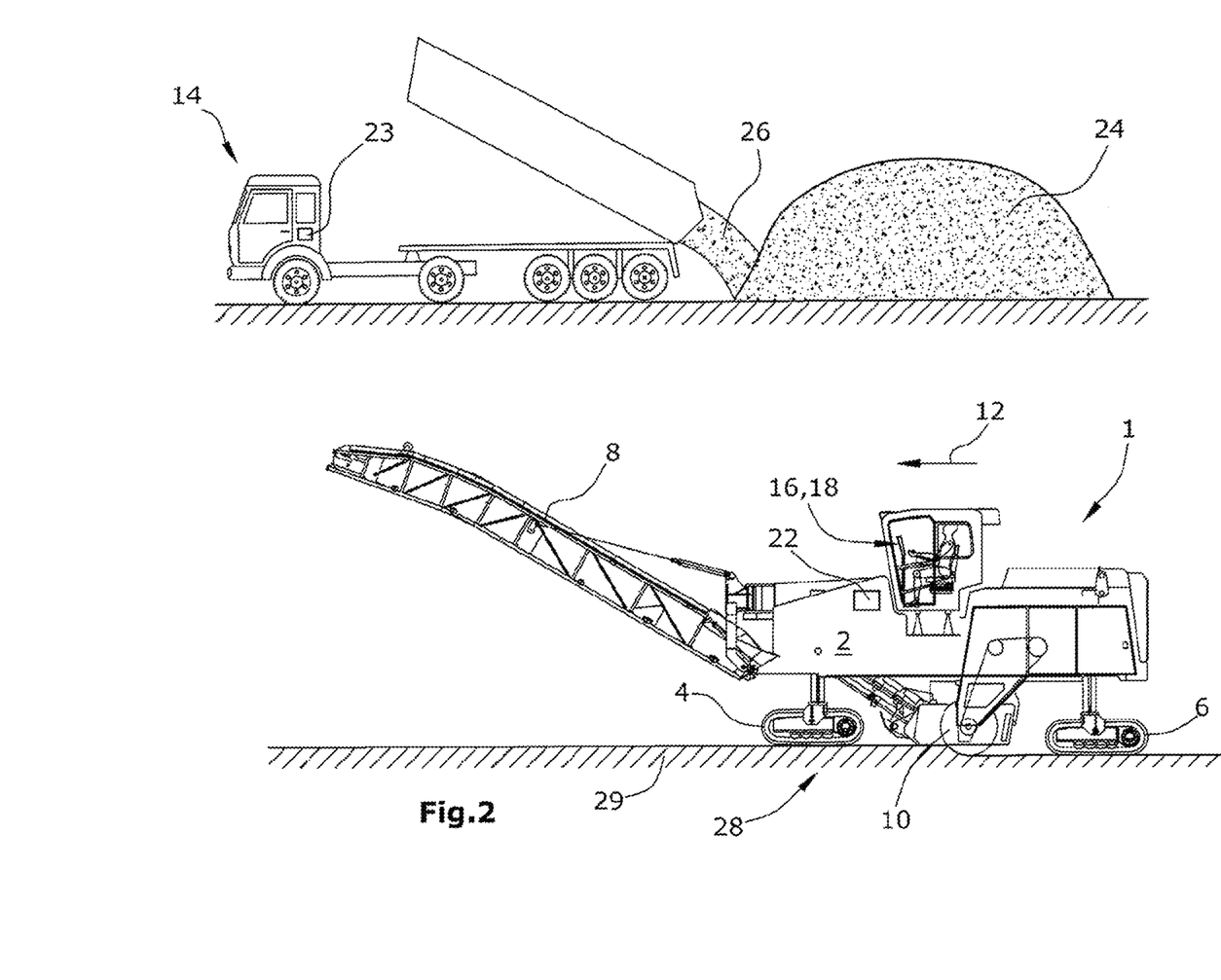
FIG. 2 represents an embodiment according to FIG. 1 with a transport vehicle at the deposition site.

A system 3 for the tracking of milling material is depicted in FIG. 1. The system 3 comprises a milling machine 1 for milling a section 28 of a ground pavement 29 in a milling operation. The ground pavement 29 is milled by means of the milling machine 1, and the removed milling material 26 is loaded, via no less than one transport conveyor 8, onto a transport vehicle designed in the present embodiments as a truck 14. As is depicted in FIG. 2, the milling material 26 loaded onto the truck 14 may be deposited on a deposition site 24.

The milling machine 1 may comprise, as a minimum, a machine frame 2. Furthermore, the milling machine comprises a height-adjustable milling drum 10 for working the ground pavement 29 where, in a milling operation, the milling drum 10 works the ground pavement 29.

The milling drum 10 is driven by a drive unit. The drive unit is preferably a drive motor, specifically, a combustion engine.

The milling machine 1 comprises front and rear travelling devices 4, 6 as seen in the direction of operation 12. Said travelling devices 4, 6 may be wheels or tracked ground-engaging units.

The travelling devices 4, 6 may be connected to the machine frame 2 via lifting columns. The milling machine 1 or the machine frame 2, respectively, can be adjusted in height relative to the ground pavement 29 by means of the lifting columns. The machine frame 2 is adjusted in height by adjusting the lifting columns, and as a result, the milling drum 10 mounted in the machine frame 2 is adjusted in height as well. Alternatively or additionally, the milling drum 10 may be adjustable in height relative to the machine frame 2.

A first detection device 18 is depicted by means of which data signals relating to the milling material can be detected. In the embodiment depicted, the first detection device 18 is arranged at the milling machine 1. The first detection device 18 may detect data signals relating to the milling material. These may, for example, be operating parameters of the milling machine 1, or data or data signals, respectively, which are determined by means of the operating parameters.

Operating parameters may be the milling depth, the milling volume removed, the advance speed, the milling drum speed of revolution, the relation between advance speed and milling drum speed of revolution, the milling drum used, the torque/output emitted by the drive engine of the milling machine, or the amount of water added during the milling process to cool the milling tools. Furthermore, it may be detected as to whether the milling machine is operating in down-milling or up-milling mode (milling drum rotating in the same direction/in the opposite direction as the ground-engaging units). Based on said operating parameters, the quantity or the volume or mass, respectively, of the removed milling material can be determined, or conclusions can indirectly be drawn about the material properties of the milling material. Said material properties or data determined can be detected as data signals relating to the milling material.

Also, the first detection device 18 may detect further material properties of the milling material not determinable on the basis of the operating parameters as data signals relating to the milling material. The location data of the milled section 28 of the ground pavement 29 may, for example, be detected. It may be known which material has been used in the construction of said section 28 so that conclusions can be drawn about the material based on the location data. Additionally or alternatively, material properties of the milling material may be entered or stored, respectively, so that the first detection device 18 can detect said material properties of the milling material.

Information regarding the layer of the ground pavement 29 just milled may also be derived from the operating parameters of the milling machine 1 or entered. Said derived or entered information can be detected as data signals relating to the milling material. These may be material properties of the milling material such as, for example, the grain size distribution in the milling material, fine fractions/coarse fractions. The physical properties may be derived from, for example, the relation between the advance rate and the milling drum speed of revolution, or the milling drum used.

Furthermore, it may be determined from the operating parameters, for example, from the milling depth, which layer of the ground pavement has been milled. The ground pavement comprises, for example, a surface layer, a binder layer and a base layer which, as a rule, feature different layer thicknesses. In addition to the milling depth, location data detected by the milling machine may also be taken into account, for example, to determine as to whether milling has already been performed in a specific position. This information can be correlated to allow for more accurate conclusions to be drawn about the layer just milled.

The first detection device 18 may detect the operating parameters via the control device 16 of the milling machine 1.

The first detection device 18 may be arranged at the milling machine, and preferably is part of the control device of the milling machine.

The first detection device 18 may also be arranged externally from the milling machine 1.

The system 3 for the tracking of milling material may furthermore comprise a second detection device 23 which detects position data of the deposition site of the milling material. For this purpose, the second detection device 23 may, for example, be arranged at the truck 14 as depicted in FIGS. 1 and 2. When the truck is at the deposition site 24, position data signals may, for example, be detected at the deposition site which may represent the position data of the deposition site. Said position data signals may, for example, be GPS signals. Position data may be coordinates or, for example, also the name of a landfill site which is determined by means of the GPS signals. The second detection device may also be arranged at the milled-off milling material 26.

The second detection device 23 may also detect the position data, for example, at the deposition site, for example, in that, for example, a transponder, for example, an RFID chip, is positioned at the deposition site. An identification code for the deposition site is stored in said transponder. This may be the name of the place, the coordinates, the name of the deposition site, or any other identification of the deposition site, where the deposition site may be a landfill site. The second detection device may detect the identification code of the transponder. The transponder may be arranged, for example, at the entrance gate of a landfill site. Alternatively, the position data may also be entered into the second detection device manually, for example, the name of a landfill site.

In the process, detection of the position data may be effected automatically, for example, when the truck is unloaded. The second detection device 23 may, for example, register "dumping"—for example, because the second detection device may be connected to the controller of the truck or because vibrations are registered when dumping. Dumping may also be determined based on the motion profile of the truck, for example, based on the idle time or different acceleration profiles when the truck is loaded or unloaded. Alternatively, detection may be triggered by the driver.

The second detection device 23 may, for example, be a transponder, specifically, RFID chip or a device comprising a GPS receiver and preferably transmitter for the transmission of GPS data. The second detection device may also be a reading device, for example, for reading out data of a signal-transmitting device or a transponder. The second detection device 23 may also be a mobile telephone which is, for example, carried along by the truck driver of the truck. An application may be installed in said mobile telephone which, by operating the mobile telephone, detects the GPS signals and stores them as position data. The mobile telephone may transmit the position data to a documentation device 22 via an internet connection. Alternatively, the position data may, for example, be entered at deposition site.

A documentation device 22 is furthermore specified to which the first detection device 18 and the second detection device 23 transmit the data signals relating to the milling material and the position data of the deposition site, respectively, where the documentation device 22 links the position data with the data signals relating to the milling material. It can thus be identified precisely which milled-off milling material has been deposited at which deposition site, with the position data of the deposition site being precisely known.

Transmission of the data and/or position signals between the first detection device and the documentation device and/or between the second detection device and the documentation device may be effected via, at least in part, a wireless connection, specifically, radio connection such as, for example, a WLAN or Bluetooth connection.

The data signals relating to the milling material may be data signals relating to the material properties of the milling material, specifically, the material of the milling material and/or location data of the milled section of the ground pavement.

Regarding the data signals relating to the material properties of the milling material, these may be data signals which directly describe the material properties of the material, or may be data signals which enable conclusions to be drawn about the material. For the purposes of the invention, the location data of the milled section of the ground pavement may therefore also be data signals relating to the material properties of the milling material. It may be determined, for example, which motorway section is being milled. It may be known which material has been used in the construction of the motorway section so that it can be determined based on the motorway section which material has been used in its construction.

It may be known, for example, which asphalt has been used in the construction, or the composition of the material used in the construction may be known. It may also be known which material has been used in the construction of different layers of the ground pavement. As a rule, the ground pavement comprises a surface layer, a binder layer and a base layer which, as a rule, feature different layer thicknesses. The known information regarding the material may be stored in a data base (for example, locally on the milling machine or outside of the milling machine), or said information may be entered by an operator of the milling machine. The location data may also be determined based on GPS coordinates. Said data signals relating to the material properties of the milling material may then be detected by the first detection device.

Samples of the milled-off material may also be taken, for example, and evaluated immediately or at a later date. For the purposes of the invention, the data signals relating to the material properties of the milling material may also be data signals which relate to the number or the name of such sample.

Material properties of the milling material may be of interest for disposal and recycling. It may be important, for example, that it is known as to whether tar is contained in the milling material, since tar requires separate disposal. Furthermore, knowledge regarding the bitumen proportions in the milling material may be relevant for recycling.

The information from which layer of the road pavement structure the milling material originates may already be of importance as a material property. In the course of a reuse, material from a base layer must, for example, not be used for the production of an asphalt mixture which is to be used as the surface layer in a new road pavement structure. The milling material originating from a surface layer, on the other hand, may be recycled into an asphalt mixture which is used as the base layer in a new road pavement structure.

GPS data may, for example, be stored as position data. It may, however, also only be indicated on which landfill site the milling material has been deposited. Transmission of the data signals relating to the milling material and of the position data between the first and/or the second detection device 18, 23 and the documentation device 22 may be effected via a wireless connection, specifically, radio connection and/or internet connection.

The system 3 for the tracking of milling material may comprise a marking device 20. The first detection device 18 transmits the data signals relating to the milling material to the marking device 20. The marking device 20 marks, depending on the data signals relating to the milling material transmitted, the milling material 26 deposited on the truck 14 with a marking means 21.

The marking means 21 may be a data storage device, for example an electronic data storage device. An exemplary electronic data storage device may include a transponder or an RFID chip. Marking data may be transmitted to the marking means by means of a wireless connection, with the marking means being the data storage device. The marking data may be the data signals relating to the milling material, or may be data which are determined based on the data signals relating to the milling material. As has already been described, specific materials can be determined on the basis of the data signals relating to the milling material. Said materials may be transmitted as marking data, for example, to the marking means 21 designed as a data storage device. It can thus be determined by means of the detection device as to whether, for example, any materials are contained in the milling material which are classified as hazardous waste. Depending on this, using an example as further described below a specific paint can be chosen. Alternatively, a term derived therefrom, for example, such as, for example, "special waste", may also be transmitted to the marking means 21. It is, however, also possible, for example, to transmit merely a specific number. The data signals relating to the milling material can then be stored in the documentation device 22 in such a fashion that they can, for example, be assigned to said number.

Figure 3:
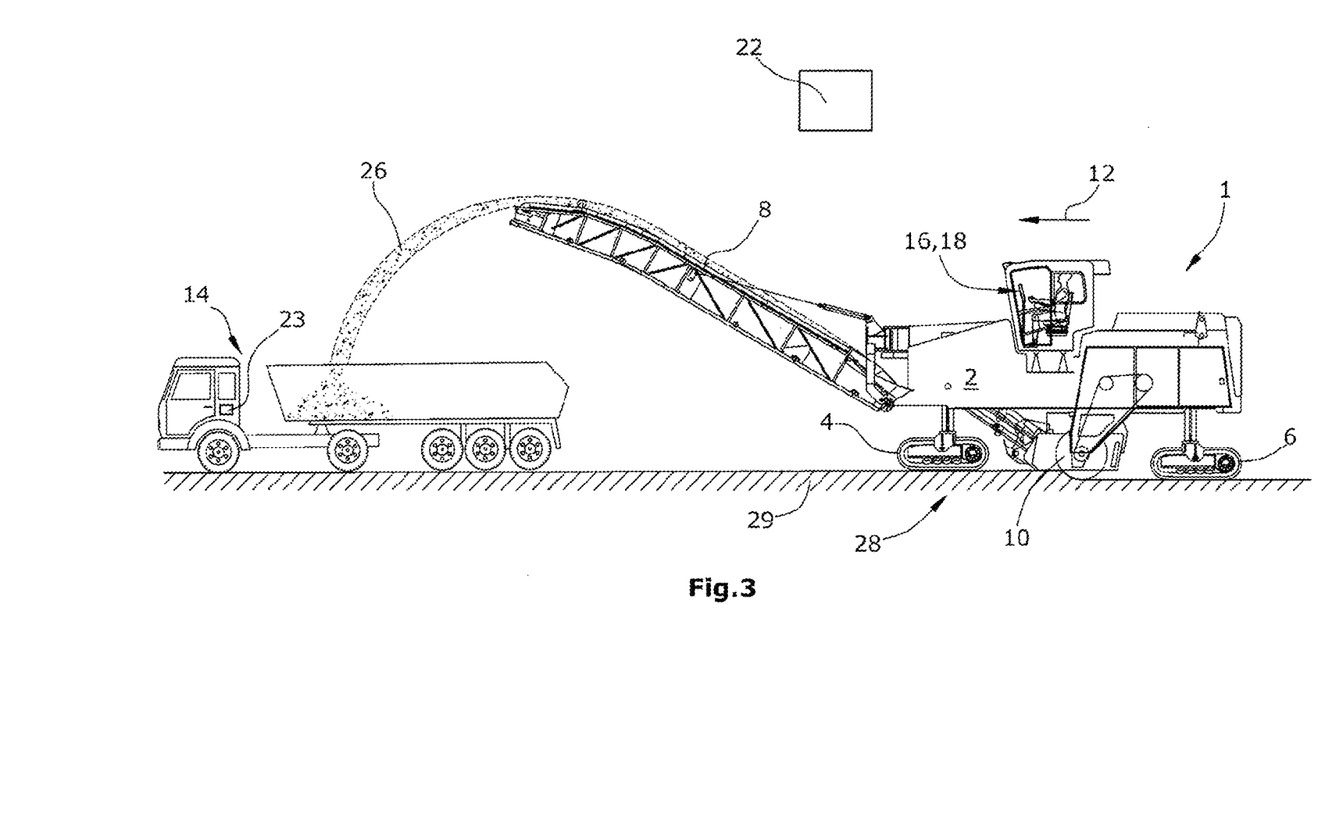
FIG. 3 represents an alternative embodiment of a tracking system.

In an alternative embodiment as represented in FIG. 3, the marking device 20 marks the milling material 26 deposited on the truck 14 with a marking means 21'. In the embodiment depicted, the marking means 21' may be a paint. The marking device 20 may apply different paints to the milling material 26 depending on the data signals relating to the milling material.

Marking of the milling material may be effected in a continuous process. The entire loaded milling material may, for example, be marked with marking means. Alternatively, marking may also be effected only when the loading process is nearing completion. The transmission of a marking means may, for example, be effected when the truck is almost fully loaded so that merely a single marking means serves to mark the entire loaded material. All intermediate stages are, however, also possible. One marking means each may thus be specified at the beginning or at the end of the loading process or, for example, also per predetermined quantity such as, for example, one marking means per tonne of milling material.

As further depicted in FIG. 3, the documentation device 22 may also be arranged externally from the milling machine 1 and the truck 14.

The first detection device 18 and/or the second detection device 20 may also be arranged externally from the milling machine and/or from the truck 14.

Figure 4:
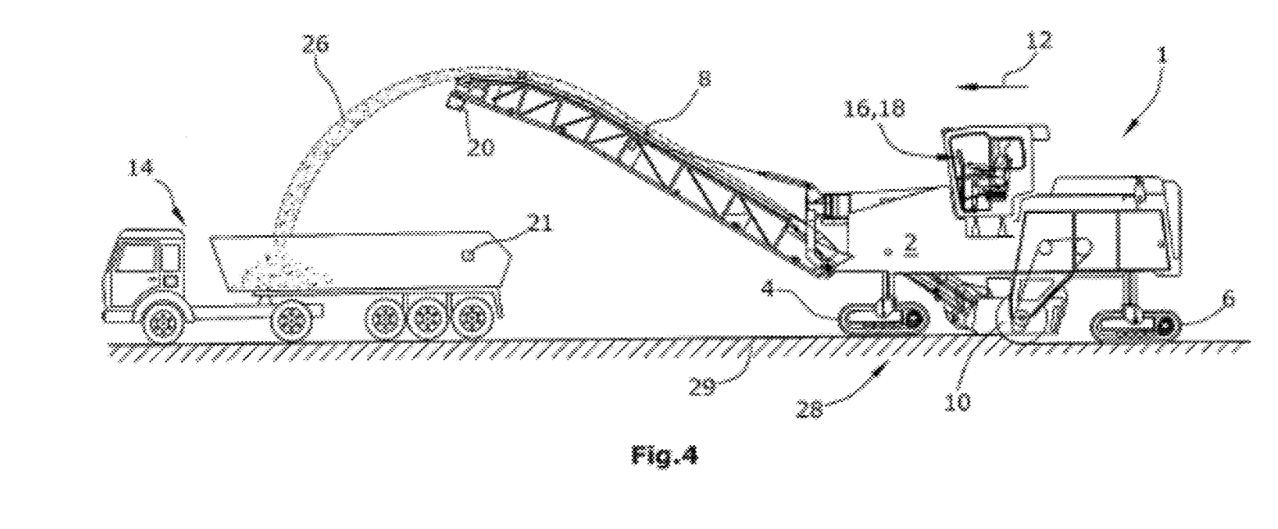
FIG. 4 represents a further alternative embodiment.

A further alternative embodiment is depicted in FIG. 4. In the embodiment depicted, the truck 14 comprises a data storage device. The marking device 20 transmits marking data to the data storage device. By transmitting the marking data to the data storage device, the data storage device becomes a marking means 21. The truck 14 loaded with the milling material is thus marked with a marking means 21. The marking means 21 can be read out, for example, when the truck 14 drives to a disposal site.

The marking device 20 may also, for example, be a printer and, depending on the data signals relating to the milling material, print specific information on a sheet of paper. Said sheet of paper may constitute a marking means, where the marking means can be sent along with the truck 14 loaded with the milling material, thus marking the truck 14 loaded with the milling material.

Figure 5:
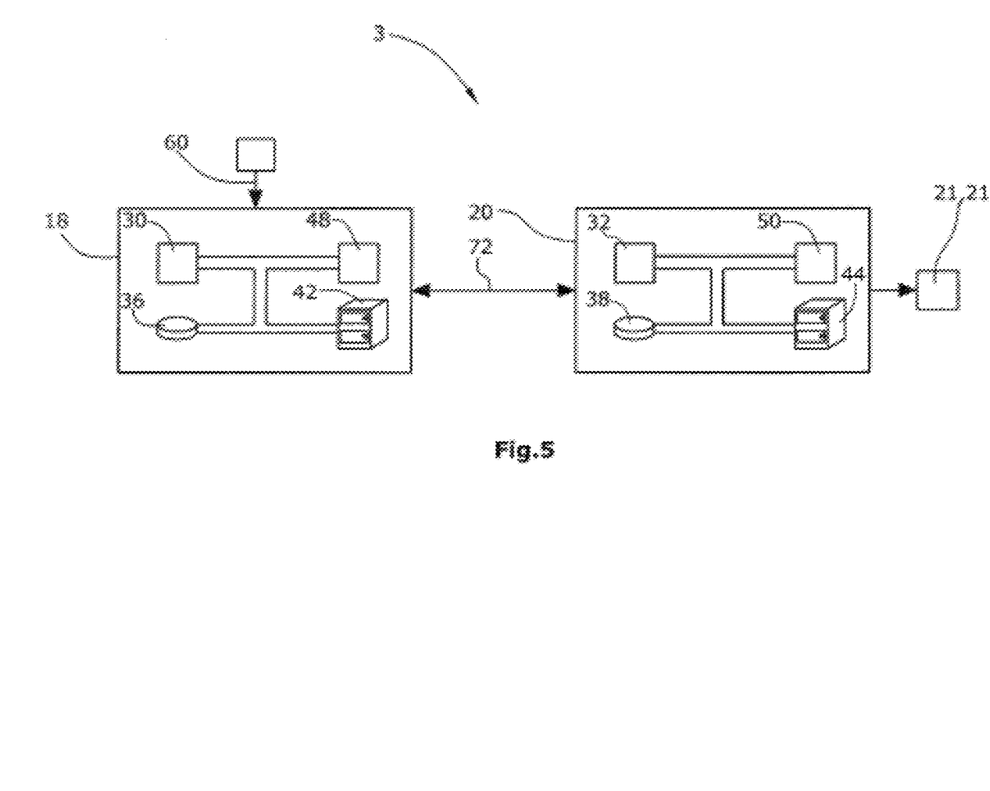
FIG. 5 represents a further alternative embodiment.

The first detection device 18, as well as an embodiment of the marking device 20, is depicted in FIG. 5. The first detection device 18 as well as the marking device 20 may be computer systems. Said computer systems may comprise processors 30, 32 and/or computer-readable memories 36, 38 and/or data storage media/databases 42, 44. The first detection device 18 and/or the marking device 20 may also comprise or otherwise functionally link to an I/O platform or module 48, 50, which may typically comprise a user interface.

The first detection device 18 may detect data signals 60. The data signals 60 may be detected from the control device 16 or may also be entered. Alternatively, the first detection device 18 may also directly receive the data signals 60 from sensors of the milling machine 1. From the data signals 60, the first detection device 18 may determine the data signals relating to the milling material. If the data signals 60 include, for example, the milling drum speed of revolution and the advance speed of the milling machine, said data signals 60 can be correlated with a grain size distribution of the milling material by means of the processor 30 and/or the database 42. If the data signals 60 include GPS coordinates that are representative for the section 28 of the ground pavement just milled, the material properties of the material present in said section 28 may be stored in the database 42.

The first detection device 18 may transmit the data or data signals determined to the marking device 20 via a data connection 72. Alternatively or additionally, the data signals 60 may be transmitted to the marking device 20 as data signals relating to the milling material. The marking device 20 may, depending on the data signals relating to the milling material, mark the milling material deposited on the truck 14, or the truck loaded with the milling material, with a marking means 21, 21'.

The marking device 20 may choose the marking means 21, 21' depending on the data signals relating to the milling material. If the marking means 21, 21' is a data storage device, the marking device 20 may, depending on the data signals relating to the milling material, transmit specific marking data to the marking means 21. It can thus be tracked which milling material is transported away on the respective truck.

The first detection device 18 and the marking device 20 may also be designed as a single unit.

Figure 6:
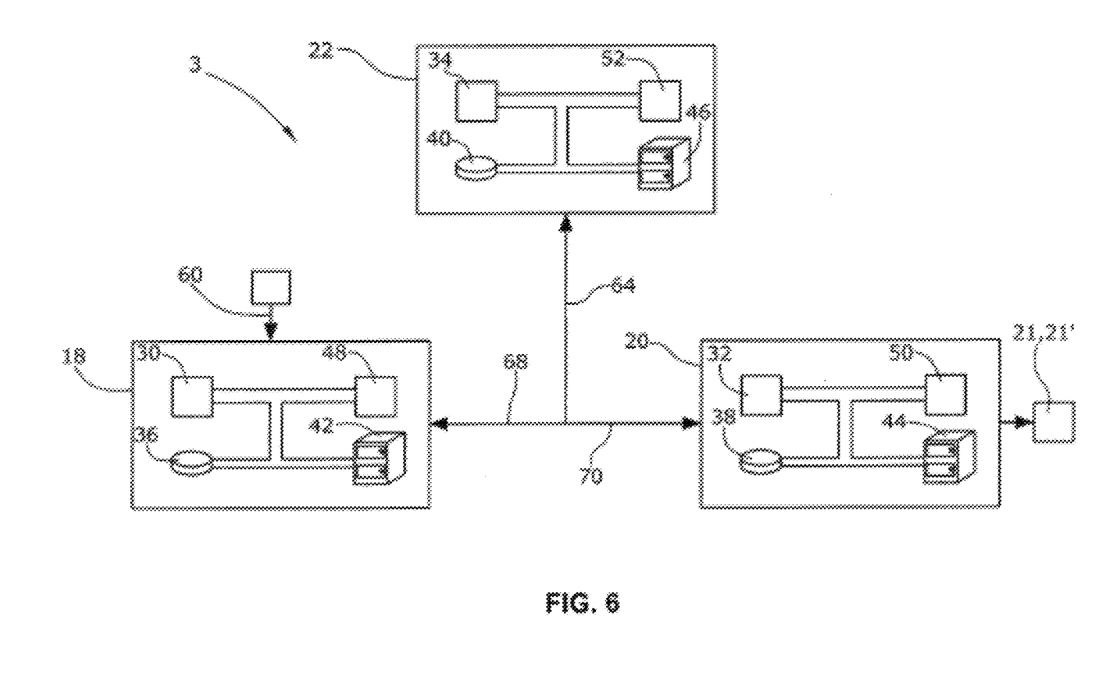
FIG. 6 represents a further alternative embodiment.

A further embodiment is depicted in FIG. 6. Said embodiment is different from FIG. 5 in that the documentation device 22 is further specified. The data signals relating to the milling material may be stored in said documentation device 22. Also, information may be stored from the marking device 20 as to which marking means 21, 21' has been used to mark the respective deposited milling material. Said information regarding the marking means and the data signals relating to the milling material may be interlinked in the documentation device 22.

The documentation device 22 may also comprise a processor 34 and/or a computer-readable memory 40 and/or a database 46 and/or an I/O platform or module 52 which typically comprises a user interface.

Figure 7:
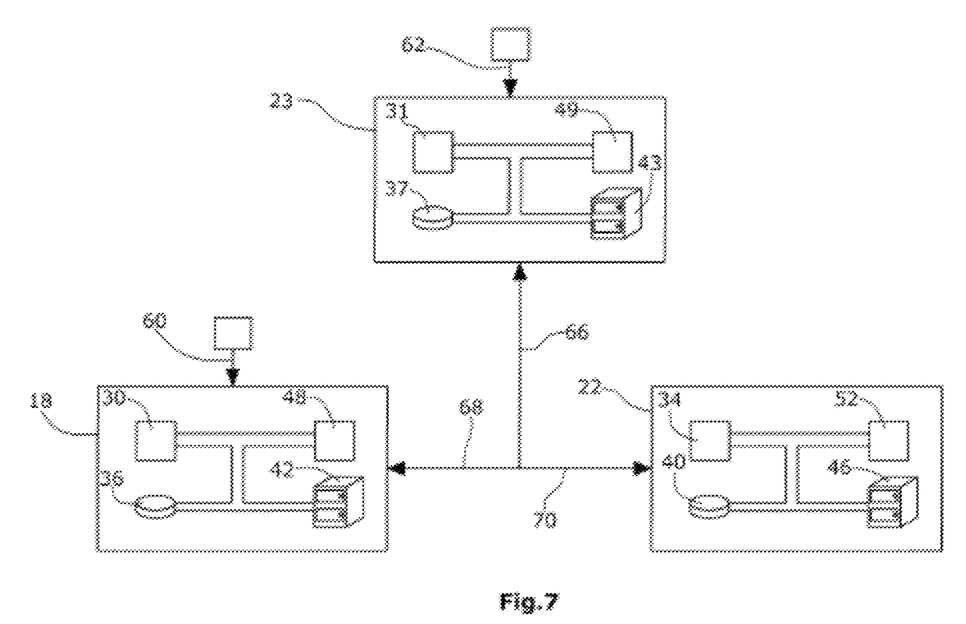
FIG. 7 represents a further alternative embodiment.

In an embodiment as represented in FIG. 7, the first detection device 18, the second detection device 23 and the documentation device 22 are depicted.

The first detection device 18, the second detection device 23 and the documentation device 22 may be computer systems. Said computer systems may respectively comprise processors 30, 31, 34 and/or computer-readable memories 36, 37, 40 and/or databases 42, 43, 46 and/or an I/O platform or module 48, 49, 52, which typically comprises a user interface.

The first detection device 18 may detect data signals 60. The data signals 60 may be detected from the control device 16 or may also be entered. Alternatively, the first detection device 18 may also directly receive the data signals 60 from sensors of the milling machine 1. From the data signals 60, the detection device 18 may determine the data signals relating to the milling material. If the data signals 60 include, for example, the milling drum speed of revolution and the advance speed of the milling machine, said data signals 60 can be correlated with a grain size distribution of the milling material by means of the processor 30 and/or the database 42. If the data signals 60 include GPS coordinates that are representative for the section 28 of the ground pavement just milled, the material properties of the material present in said section 28 may be stored in the data base 42. The grain size distribution thus determined and/or the material properties may be transmitted to the documentation device 22 as data signals relating to the milling material. Alternatively or additionally, the data signals 60 may be directly transmitted to the documentation device 22 as data signals relating to the milling material.

The second detection device 23 may detect the position data of the deposition site. Said position data may be detected as position data signals 62 or be derived from the position data signals 62. Alternatively, the position data may also be entered via an interface 49.

The documentation device 22 receives the data signals relating to the milling material detected by the first detection device 18 and the position data detected by the second detection device 23. The transmission is depicted by means of the arrows 66, 68 and 70. In the documentation device 22, the data signals relating to the milling material are linked with the position data. Based on said linking, it can thus be traced which milling material was unloaded at which unloading site. This correlation can be stored in the data base 46 for later retrieval and/or for indication on a user interface of the I/O module 52.

It could also be that the documentation device 22 transmits data signals to the first and/or the second detection device 18, 23. It can thus be ensured, for example, that the assignment of the data signals relating to the milling material to the position data of the deposition site can be queried both at the first and at the second detection device 18, 23 via a user interface of the IO module 48, 49, that it can therefore be displayed in both detection devices 18, 23 as to which milling material was unloaded at which unloading site. For this purpose, data from the database 46 of the documentation device 22 may, for example, be transmitted to the databases 42, 43 of the first and second detection device 18, 23.

Figure 8:
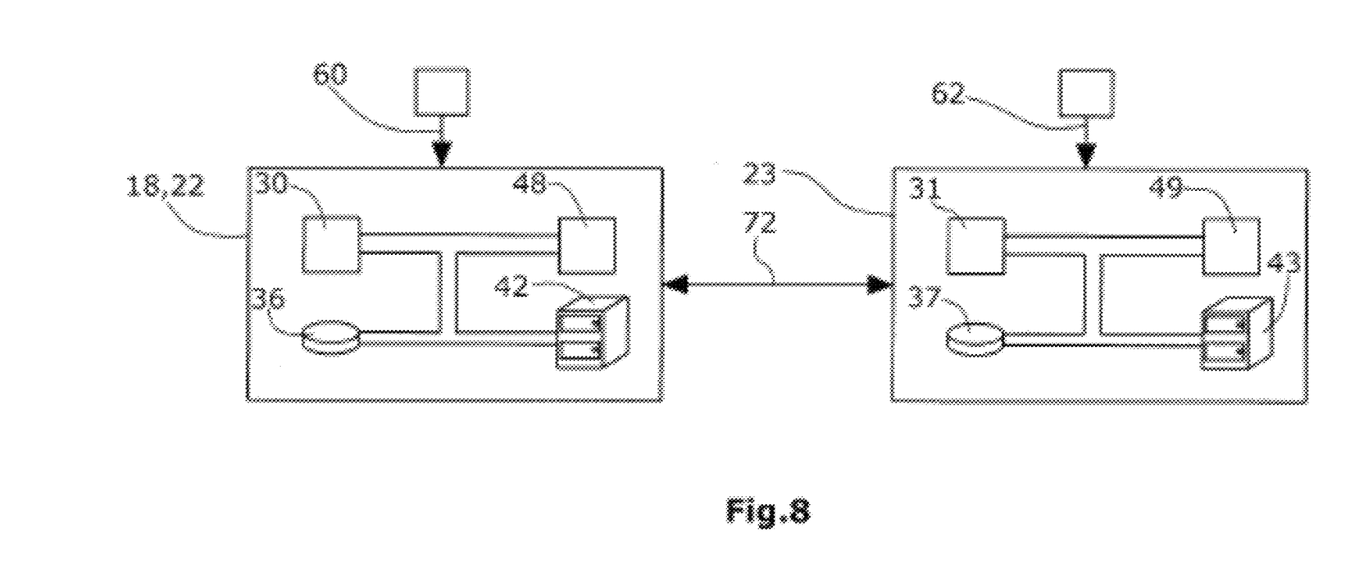
FIG. 8 represents a further alternative embodiment.

An alternative embodiment is depicted in FIG. 8.

It is depicted in FIG. 8 that the first detection device 18 and the documentation device 22 are integrated in a single system. Said integrated system may also be part of the control device 16 of the milling machine 1. The integrated system may also comprise a processor 30 and/or a memory 36 and/or an interface 48 and/or a database 42. The second detection device 23 may transmit data to the integrated system comprising the first detection device 18 and the documentation device 22. The transmission is depicted by means of the arrow 72. The first detection device 18, the second detection device 23 and/or the documentation device 22 may also be an integrated system so that a central storage of data is specified. The data signals relating to the milling material and the position data of the deposition site may be transmitted to such central system via wireless connections and each be detected at the same.

Figure 9:
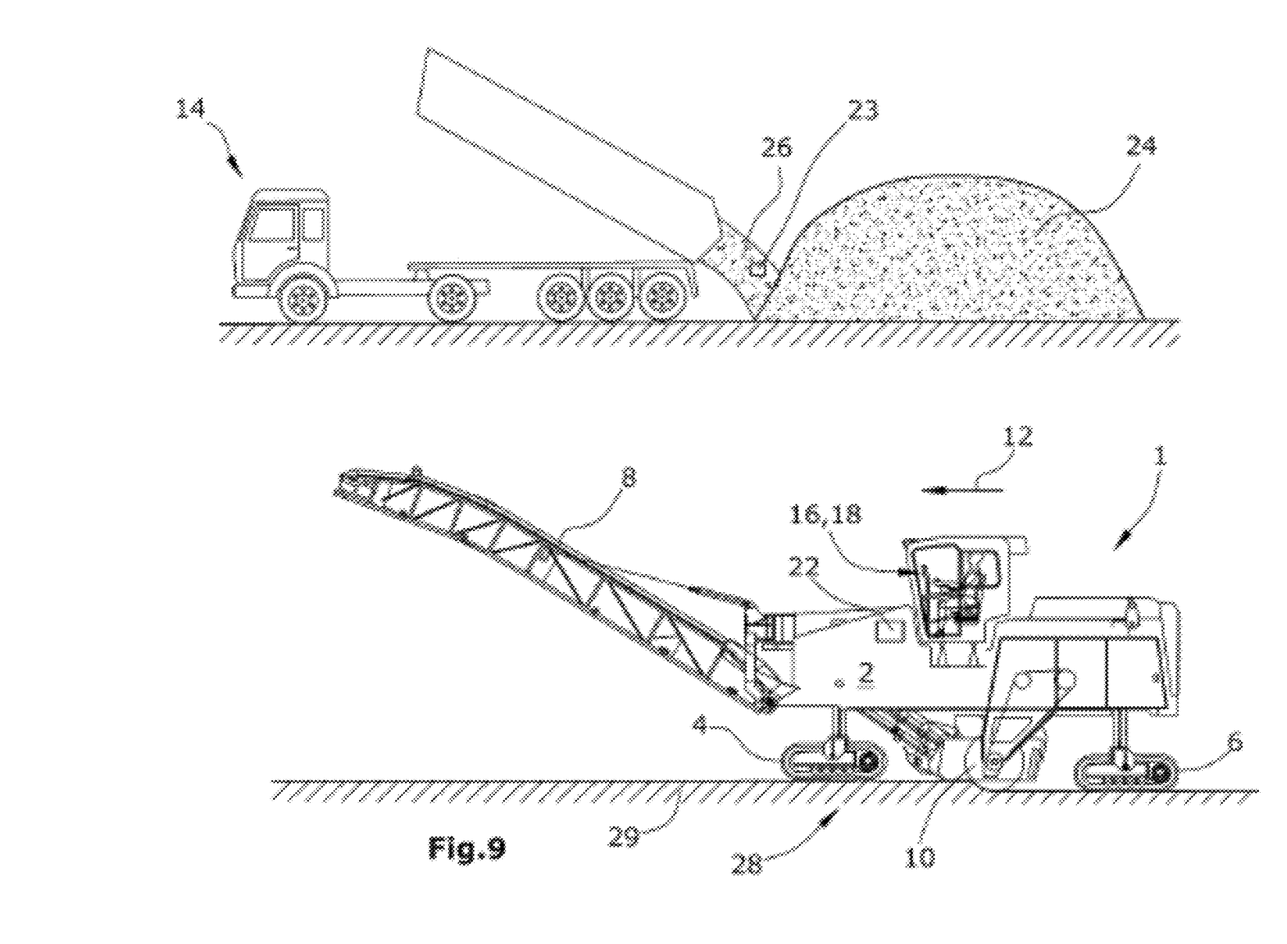
FIG. 9 represents a further alternative embodiment.

FIG. 9 shows an alternative embodiment of FIG. 2, in that the second detection device 23 is arranged at the milling material 26 deposited on the deposition site.

What is claimed is:

1. A method for the tracking of milling material, comprising:
    milling, via a milling machine in a milling operation, a section of a ground pavement in a first location;
    depositing milling material removed during milling of the section of the ground pavement onto a transport vehicle for transport to a second location;
    detecting, via a detection device associated with the milling machine, data signals relating to the milling material; and
    tracking the milling material via a documentation device comprising a user interface, based at least on the data signals relating to the milling material.

2. The method of claim 1, wherein tracking of the milling material comprises tracking of one or more specific materials or material proportions contained in the milling material based at least on the data signals relating to the milling material.

3. The method of claim 1, wherein the data signals relating to the milling material relate to position data of the milled section of the ground pavement.

4. The method of claim 1, wherein the data signals relating to the milling material comprise a milling depth or a milling volume removed during the milling operation.

5. The method of claim 4, further comprising determining from which layer of the section of the ground pavement the milling material originates.

6. The method of claim 1, further comprising:
    marking with a marking means the milling material deposited on the transport vehicle, the marking of the milling material depending on the data signals relating to the deposited milling material, or
    marking with a marking means the transport vehicle loaded with the milling material, the marking of the transport vehicle depending on the data signals relating to the milling material,
    wherein the data signals relating to the milling material deposited on the transport vehicle and information regarding the marking means used to mark the milling material deposited on the transport vehicle are interlinked in the documentation device.

7. The method of claim 6, wherein the marking means is transported away by the transport vehicle together with the milling material deposited on the transport vehicle.

8. The method of claim 6, wherein the marking means is a paint applied to the milling material deposited on the transport vehicle.

9. The method of claim 6, wherein the marking means is a data storage device associated with the transport vehicle and provided with marking data.

10. The method of claim 6, further comprising detecting, via a second detection device, position data corresponding to the second location and transmitting the position data to the documentation device,
    wherein the position data and the data relating to the milling material are interlinked in the documentation device.

11. The method of claim 10, comprising:
    detecting via the second detection device unloading of the milling material from the transport vehicle at the second location, and
    responsive to the detection of the unloading of the milling material, automatically transmitting the position data to the documentation device.

12. The method of claim 1, further comprising detecting, via a second detection device, position data corresponding to the second location and transmitting the position data to the documentation device,
    wherein the position data and the data relating to the milling material are interlinked in the documentation device.

13. The method of claim 12, comprising:
    detecting via the second detection device unloading of the milling material from the transport vehicle at the second location, and
    responsive to the detection of the unloading of the milling material, automatically transmitting the position data to the documentation device.

14. A system for the tracking of milling material, comprising:
    a milling machine configured to mill a section of a ground pavement in a milling operation, and to load onto a transport vehicle milling material removed during milling of the section of the ground pavement;
a detection device associated with the milling machine, and configured to detect data signals relating to the milling material; and
a documentation device comprising a user interface, and configured to track the milling material based at least on the data signals relating to the milling material.

15. The system of claim 14, further comprising:
a marking device configured
   to mark the milling material deposited on the transport vehicle, the marking of the milling material depending on the data signals relating to the deposited milling material, or
   to mark the transport vehicle loaded with the milling material, the marking of the transport vehicle depending on the data signals relating to the milling material,
wherein the data signals relating to the milling material deposited on the transport vehicle and information regarding the marking of the milling material deposited on the transport vehicle are interlinked in the documentation device.

16. The system of claim 15, further comprising a second detection device configured to detect position data corresponding to a deposition site for the milled material and transmitting the position data to the documentation device, wherein the position data and the data relating to the milling material are interlinked in the documentation device.

17. The system of claim 16, wherein the second detection device is configured to:
   detect unloading of the milling material from the transport vehicle at the deposition site, and
   responsive to the detection of the unloading of the milling material, to automatically transmit the position data to the documentation device.

18. The system of claim 14, further comprising a second detection device configured to detect position data corresponding to a deposition site for the milled material and transmitting the position data to the documentation device, wherein the position data and the data relating to the milling material are interlinked in the documentation device.

19. The system of claim 18, wherein the second detection device is configured to:
   detect unloading of the milling material from the transport vehicle at the deposition site, and
   responsive to the detection of the unloading of the milling material, to automatically transmit the position data to the documentation device.

20. The system of claim 14, wherein the documentation device comprising the user interface is configured to track and selectively display which milling material has been unloaded at a particular deposition site.

* * * * *